(12) United States Patent
Larson et al.

(10) Patent No.: US 8,751,365 B2
(45) Date of Patent: Jun. 10, 2014

(54) SYSTEMS AND METHODS FOR ANALYZING TRADING STRATEGIES

(75) Inventors: Glen Larson, Colorado Springs, CO (US); Kris Golden, Colorado Springs, CO (US)

(73) Assignee: Glen Larson, Colorado Springs, CO (US)

( * ) Notice: Subject to any disclaimer, the term of this patent is extended or adjusted under 35 U.S.C. 154(b) by 7 days.

(21) Appl. No.: 13/442,376

(22) Filed: Apr. 9, 2012

(65) Prior Publication Data

US 2013/0097062 A1 Apr. 18, 2013

Related U.S. Application Data

(60) Provisional application No. 61/473,438, filed on Apr. 8, 2011.

(51) Int. Cl.
*G06Q 40/00* (2012.01)

(52) U.S. Cl.
USPC .............................. 705/37; 705/35; 705/36 R

(58) Field of Classification Search
USPC ............................................. 705/35, 36 R, 37
See application file for complete search history.

(56) References Cited

U.S. PATENT DOCUMENTS

| 2007/0208657 A1* | 9/2007 | Petrino | 705/37 |
| 2008/0270289 A1* | 10/2008 | Petrino | 705/37 |
| 2010/0070402 A1* | 3/2010 | Friesen et al. | 705/37 |
| 2010/0293110 A1* | 11/2010 | Rosenthal et al. | 705/36 R |
| 2011/0238555 A1* | 9/2011 | Rosenthal | 705/37 |
| 2011/0246389 A1* | 10/2011 | Ziolek et al. | 705/36 R |
| 2011/0251942 A1* | 10/2011 | Rosenthal et al. | 705/37 |

* cited by examiner

*Primary Examiner* — Sara C Hamilton
(74) *Attorney, Agent, or Firm* — Troutman Sanders LLP; James E. Schutz; Jay R. Anderson

(57) ABSTRACT

The present analysis systems and methods provide a dynamic graphical user interface through which a user can view and modify a trading strategy. The various parts of the strategy may be graphically displayed to the user, and any modification to the strategy made by the user may be dynamically integrated into feedback of the graphical user interface.

20 Claims, 15 Drawing Sheets

Fig. 3

SYSTEMS AND METHODS FOR ANALYZING TRADING STRATEGIES

CROSS-REFERENCE TO RELATED APPLICATIONS

This application claims a benefit, under 35 U.S.C. §119(e), of U.S. Provisional Application Ser. No. 61/473,438, filed 8 Apr. 2011, the entire contents and substance of which are hereby incorporated by reference as if fully set forth below.

TECHNICAL FIELD

Various embodiments of the present invention relate to data analysis and, more particularly, to systems and methods for analyzing trading strategies.

BACKGROUND

To assist both professionals and those who manage their own personal stock portfolios with trading, some conventional trading software packages exist. These packages, however, are capable of little more than analyzing the history of a stock and numerically applying a trading strategy. Accordingly, these packages do not provide users with true power to analyze data and customize trading strategies in an intuitive and dynamic environment.

SUMMARY

There is a need for systems and methods enabling intuitive, graphical analysis and modification of trading strategies through a dynamic graphical user interface. It is to such systems and methods that various embodiments of the invention are directed. Various embodiments of the invention are analysis systems and methods for providing visualizations of analyses and transaction strategies. An exemplary embodiment of the analysis, system may comprise a data unit, a selection unit, and a visualization unit.

The data unit may be associated with a data source for maintaining various data related to the overall analysis system, including historical data for one or more stocks. The data unit may provide timely data to other aspects of the system, so as to provide accurate analyses.

The selection unit may enable a user to select a transaction strategy, i.e., trading strategy, and to customize the transaction strategy as the user desires. In some embodiments, the selection unit may have access to a set of predetermined strategies from which the user may choose an initial strategy as a starting point. The selection unit may then allow the user to adjust aspects of the selected strategy.

The visualization unit may provide graphical feedback to the user based, at least in part, on the user's interactions with the selection unit. For example, the visualization unit may provide one or more charts, which may be customized with headings and variables chosen by the user. The charts may include, for example, tables, graphs, or diagrams depicting aspects of historical data or of future potential. As the user adjusts his chosen strategy, the charts may update, thus providing the user with a graphical display representing his selections.

These and other objects, features, and advantages of the analysis system will become more apparent upon reading the following specification in conjunction with the accompanying drawing figures.

BRIEF DESCRIPTION OF THE FIGURES

FIG. 3 illustrates an exemplary data chart of the analysis system.

DETAILED DESCRIPTION

Figure 1:
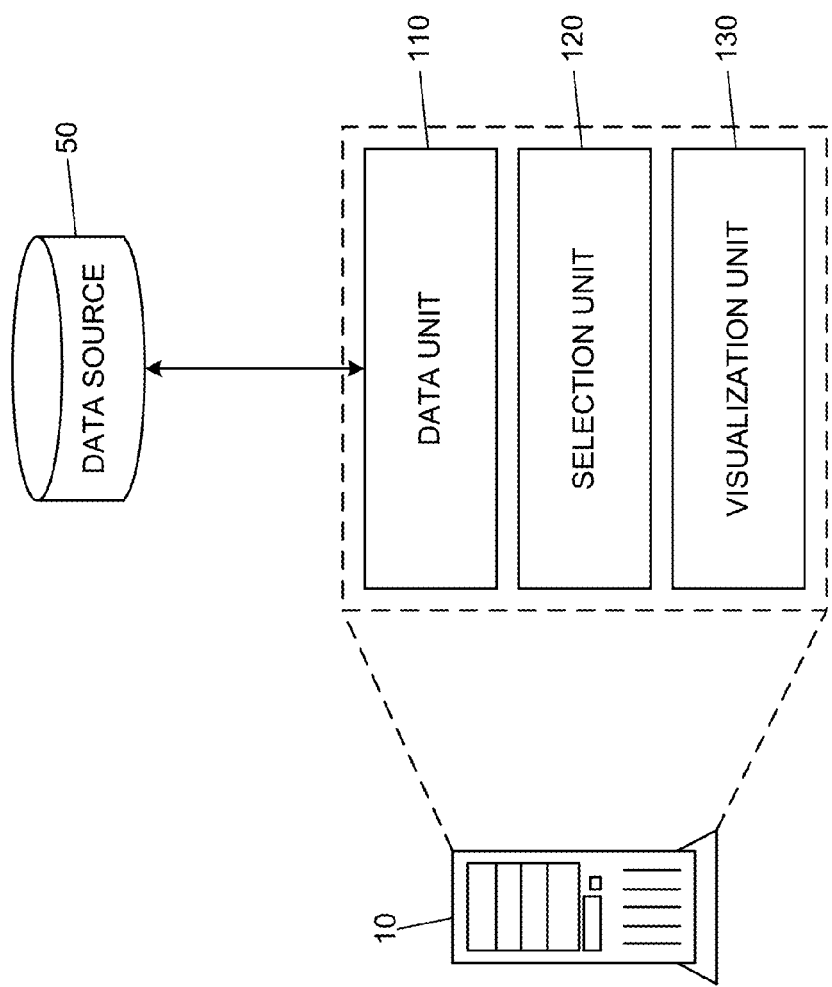
FIG. 1 illustrates a diagram of an exemplary analysis system.

Various embodiments of the present invention are systems and methods for analyzing trading strategies. The invention is described in the context of being an analysis system for stock sales and purchases. Embodiments of the invention, however, are not limited to this context. Rather, embodiments of the invention may analyze data and strategies in various contexts, such as, for example, buying and selling real estate or other assets. It will thus be understood that the embodiments of the invention described herein are provided for illustrative purposes only.

The analysis systems and methods may be implemented in various manners. For example, and not limitation, the analysis systems and methods may be embodied in a computer system or a computer program product. If implemented in a computer program product, various aspects of the analysis systems and methods may be embodied in computer-readable instructions for execution by a processor.

Referring now to the figures, wherein like reference numerals represent like parts throughout the views, various embodiments of the analysis systems and methods will be described in detail.

FIG. 1 illustrates a diagram of the analysis system 100, according to an exemplary embodiment. As shown in FIG. 1, an exemplary embodiment of the analysis system may comprise a data unit 110, a selection unit 120, and a visualization unit 130.

The data unit 110 may comprise or otherwise be associated with one or more data sources 50 for providing various data related to the overall analysis system. For example, and not limitation, a data source 50 may be a database, text file, or other storage arrangement or medium capable of providing data to the analysis system 100. In some embodiments, the data source 50 may store data locally with respect to other components of the analysis system 100. In other embodiments, however, the data source 50 may include one or more external sources that provide data to the data unit 110, such as on a periodic basis. The data unit 110 may manage data for the analysis system 100 and provide data, such as historical data for one or more stocks, to other aspects of the analysis system 100 as needed.

The selection unit 120 may apply one or more selected strategies to data accessible through the data unit 110. In an exemplary embodiment, the analysis system 100 may enable the user to customize analyses, so as to explore various possible trading strategies.

The visualization unit 130 may display information to the user about the data in one or more graphical user interface. In an exemplary embodiment, the interfaces may enable the user to select and customize trading strategies and to select other methods of data analysis. The data unit 110 may provide historical data related to stocks, or other subject items, to the visualization unit 130 for display onto the graphical user interfaces. When data updates are received through the data unit 110, then the graphical user interfaces may dynamically update historical data as new data is received.

In an exemplary embodiment, the data unit 110, the selection unit 120, and the visualization unit 130 may be integrated, in whole or in part, in a computing device 10, such as in the form of computer hardware, computer software, or a combination thereof. Although the units are described herein as being distinct from one another, this description is provided for illustrative purposes only, to explain the various functionalities of the analysis system 100 as a whole. It will thus be understood that various structures may be used for these units, and the hardware or software incorporated into these units need not be separated into distinct components for the units described, but may overlap as needed or desired.

Figure 2:
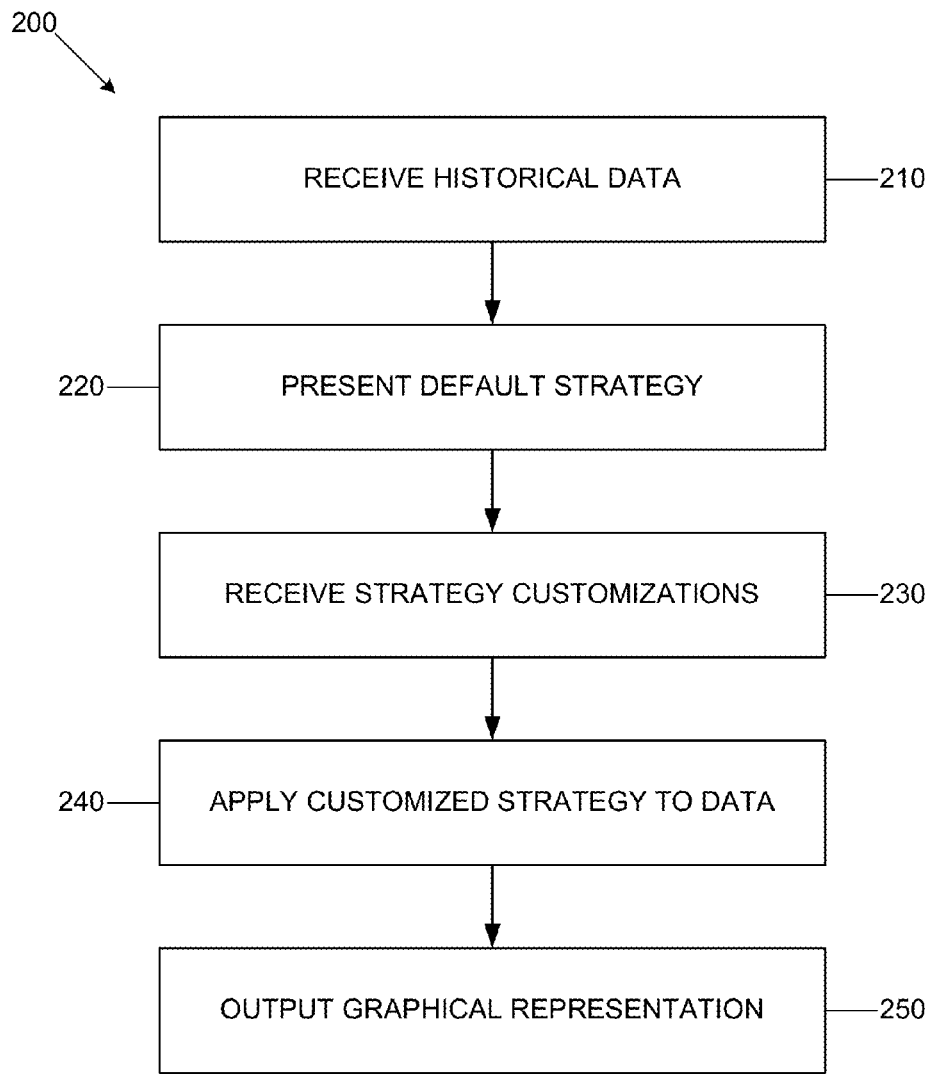
FIG. 2 illustrates a flow diagram of an exemplary analysis method.

FIG. 2 illustrates a flow diagram of an analysis method 200, according to an exemplary embodiment. Although specific steps are illustrated in FIG. 2, these steps are provided for illustrative purposes only and do not limit the scope of the various embodiments of the invention. Rather, alternative or additional steps may be used in other embodiments of the analysis method, and the steps may be performed in various sequences other than that shown.

As shown in FIG. 2, an exemplary analysis method 200 may include, at 210, receiving historical data related to transactions that may be evaluated. For example, and not limitation, the received data may be related to past stock prices for one or more stocks of interest. The stocks of interest may be selected by the user or may be predetermined by another party. At 220, the user may be presented with an initial, or default, transaction strategy. In some embodiments, the user may be presented with one or more options for transaction strategies, and the user may then select one of the options as the initial strategy. In the case of stocks, the options may be various types of trading strategies. At 230, customizations for the initial strategy may be received from the user. In an exemplary embodiment, the initial strategy is presented to the user in a graphical user interface, through which the user can customize it by adjusting a graphical representation of the strategy. Accordingly, the user can customize the strategy with minimal or no adjustments to underlying numbers or data having to be performed manually by the user. At 240, the analysis method 200 may apply the user's customizations to the initial strategy, thus automatically adjusting underlying data as necessary to match the user's graphical customizations. At 250, a graphical representation of the customized strategy may be output, and may be accompanied by an updated chart of numerical data. This may enable the user can view the customized strategy in various manners.

Figure 9:
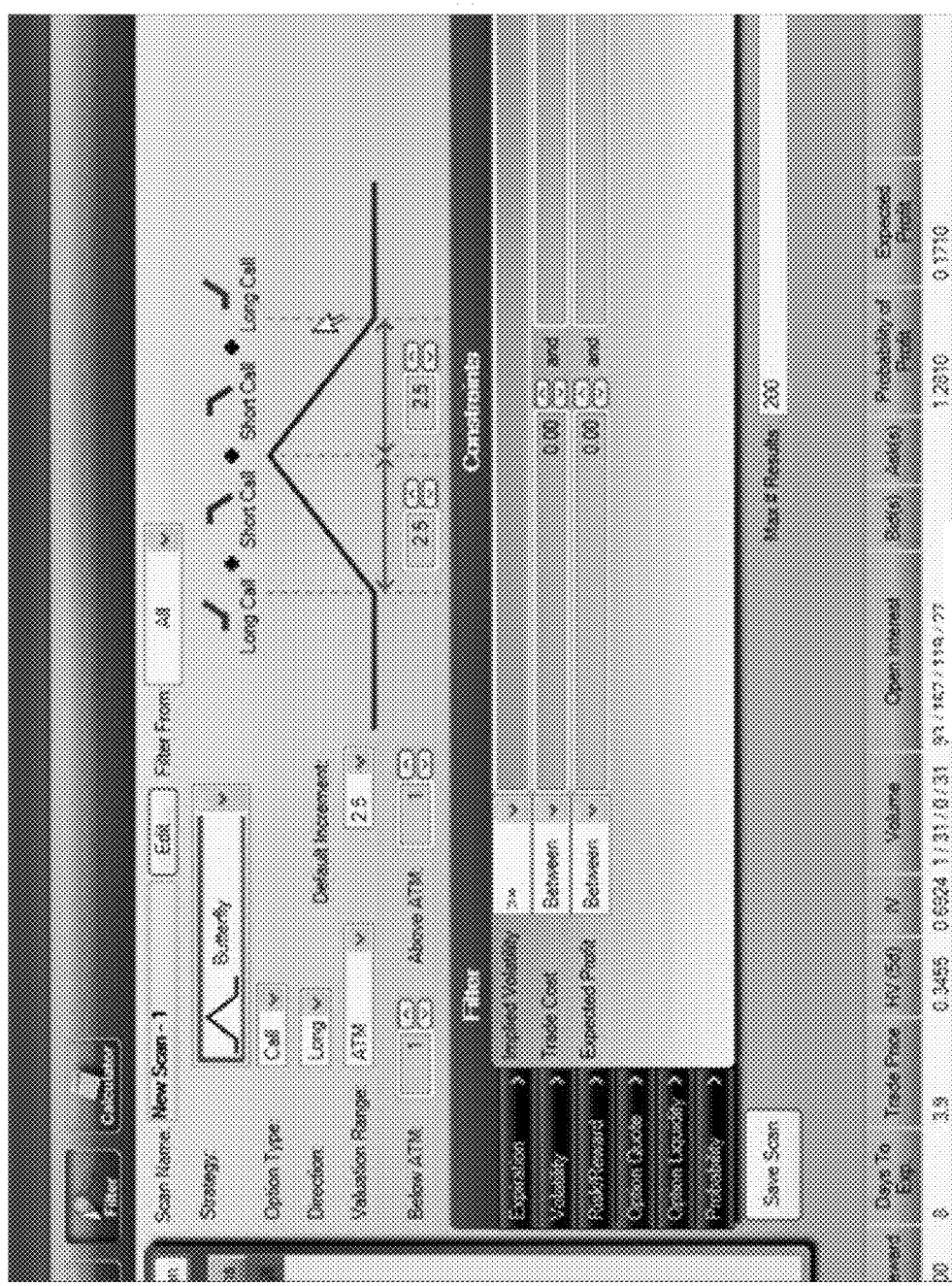
FIG. 9 illustrates various parts of a particular transaction strategy, as displayed by an exemplary graphical user interface.
Figure 10A:
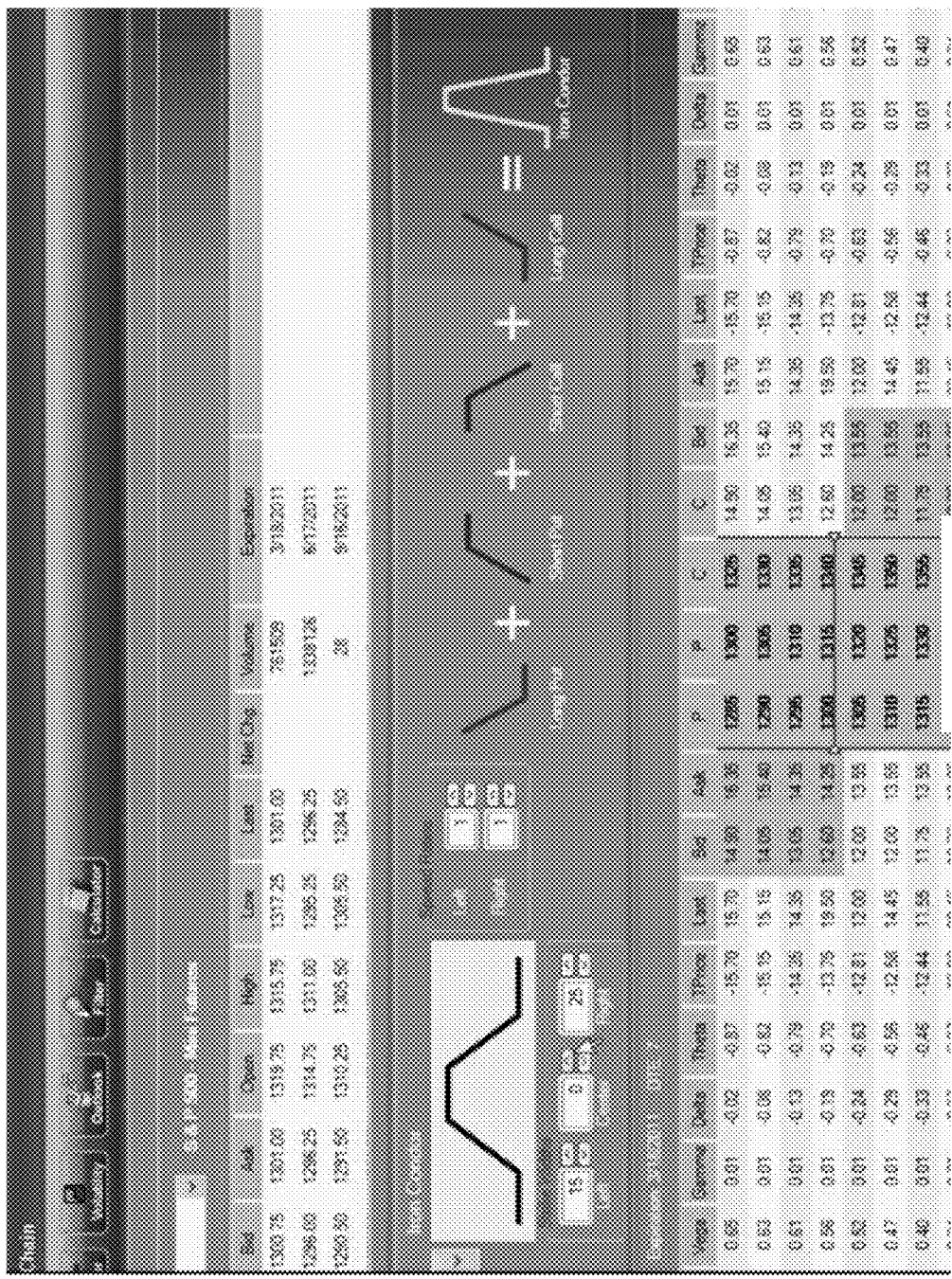
FIGS. 10A-10B illustrate an exemplary graphical user interface for modifying a transaction strategy.
Figure 10B:
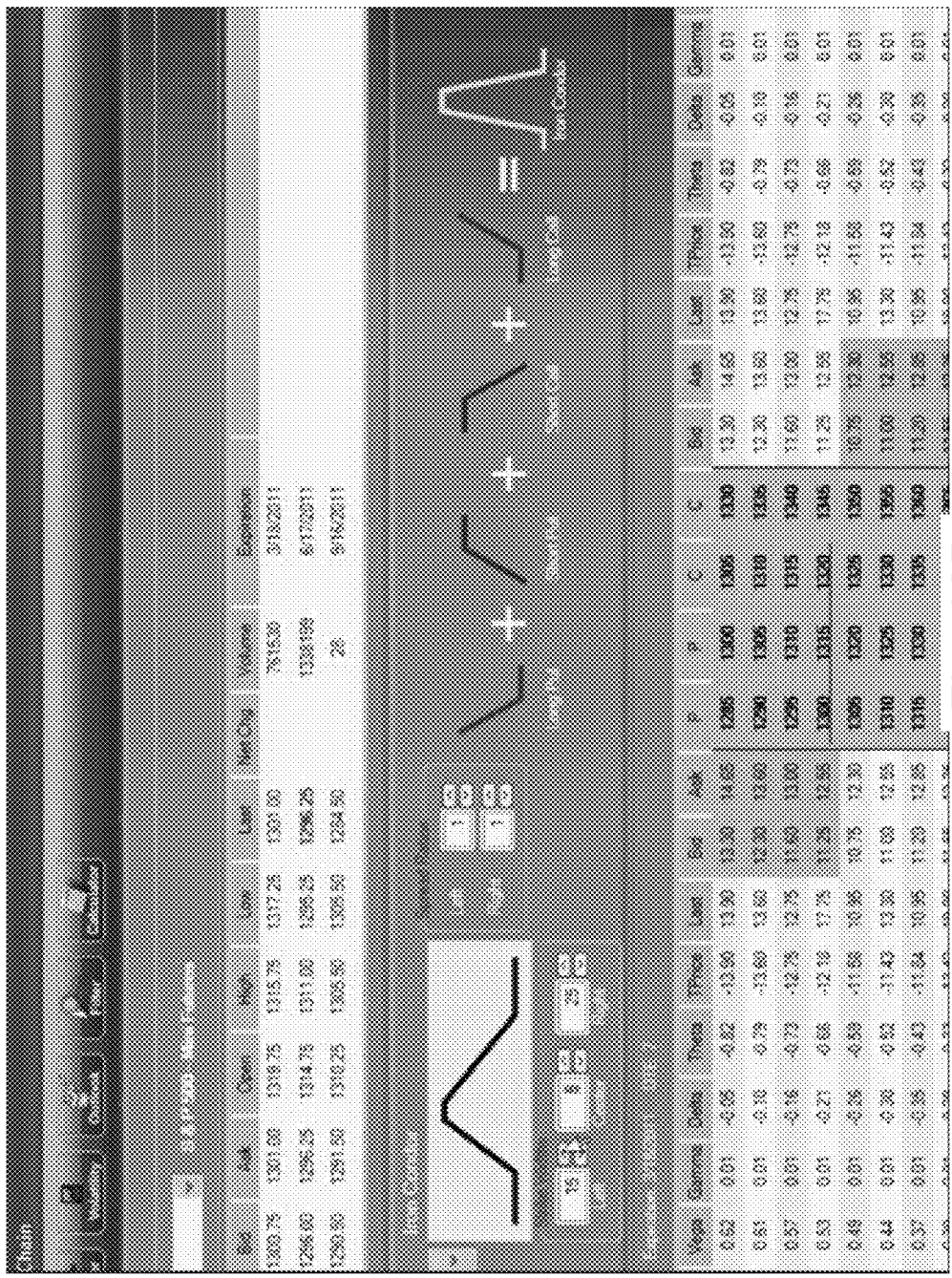
Figure 11:
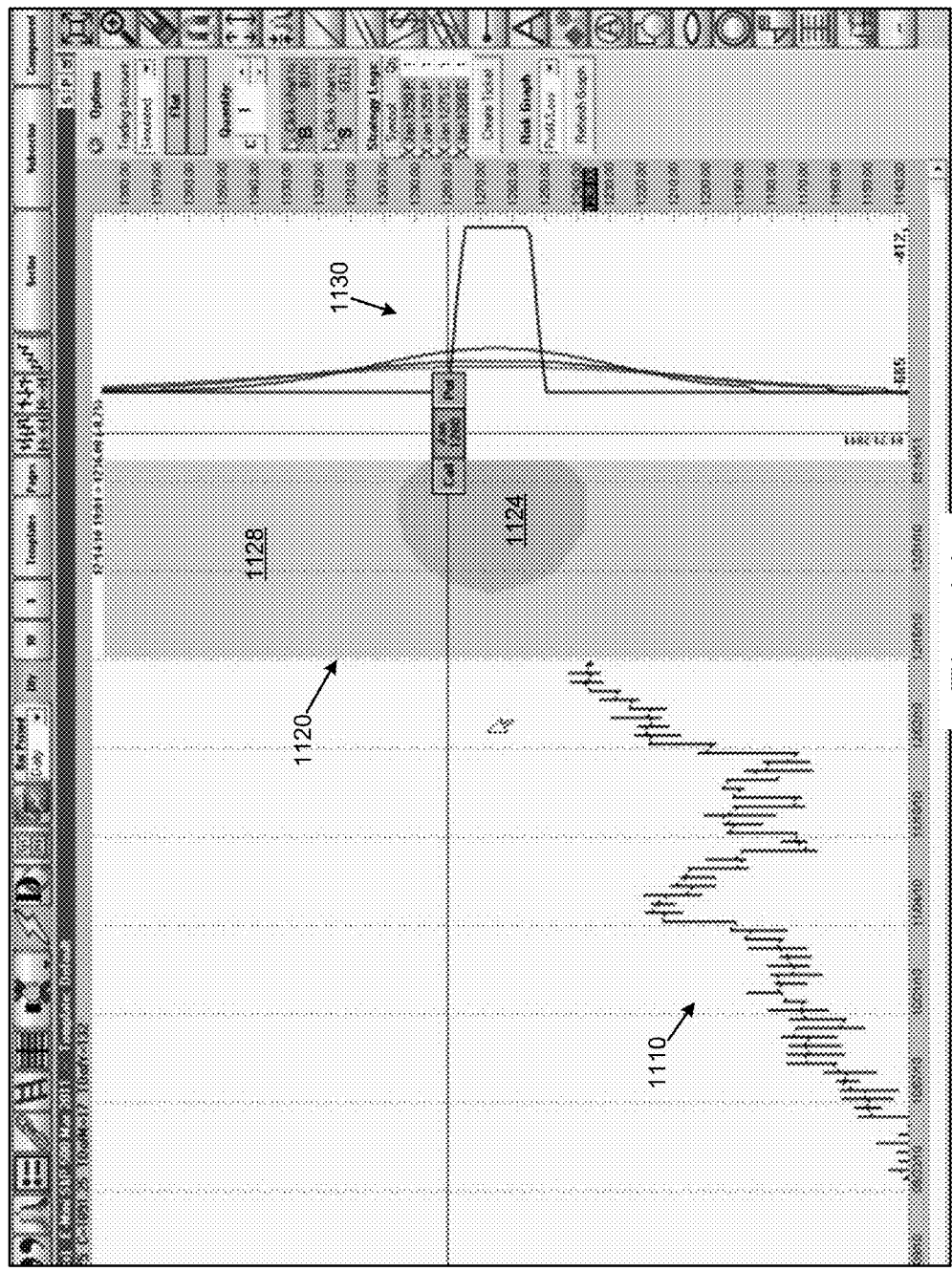
FIG. 11 illustrates an exemplary graphical user interface.
Figure 12:
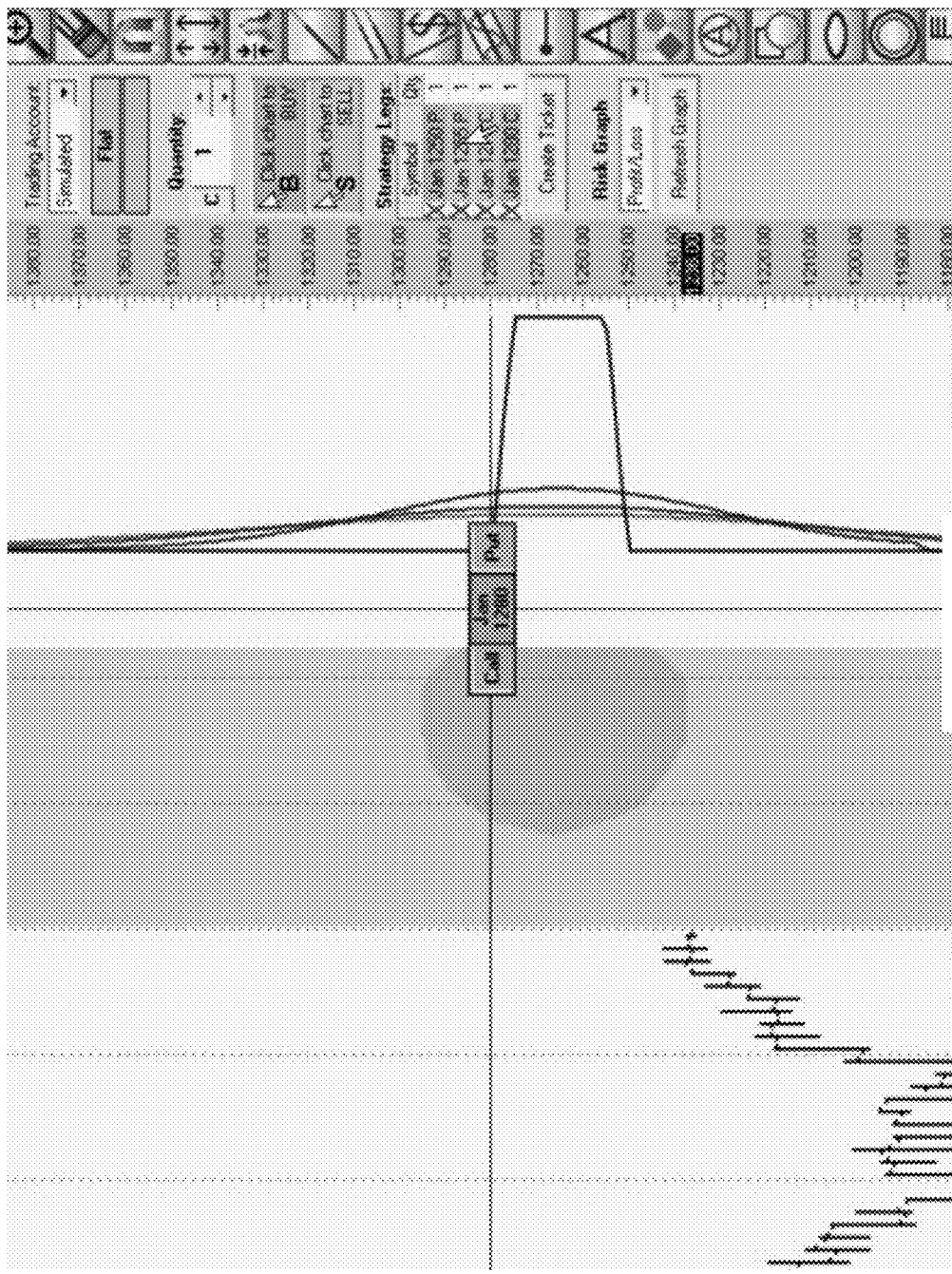
FIG. 12 illustrates an enlarged portion of FIG. 11.
Figure 13:
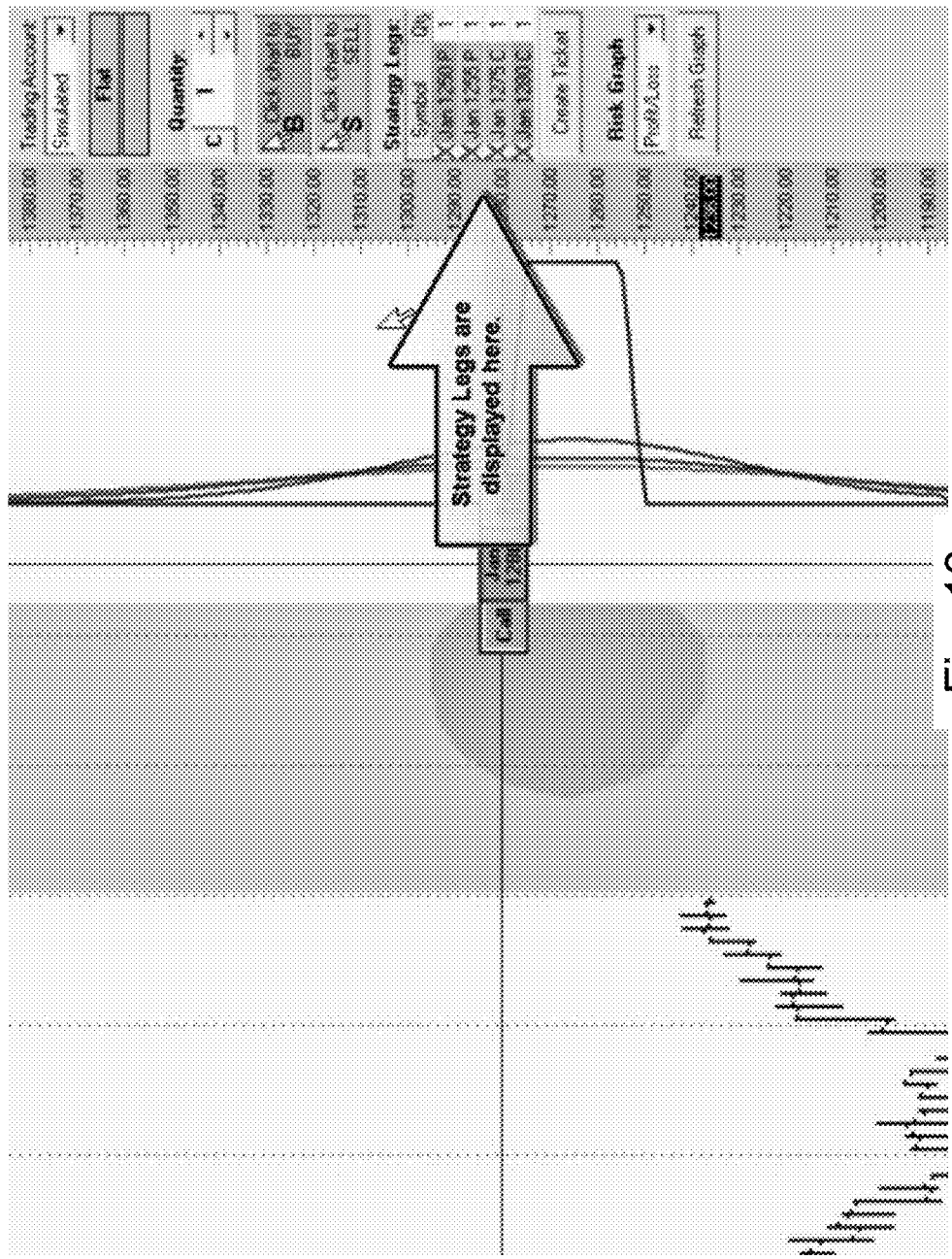
FIG. 13 illustrates the legs of a particular transaction strategy, as displayed in an exemplary graphical user interface.

The analysis system 100 may utilize one or more primary graphical user interfaces, which may be provided by the visualization unit 130, and each graphical user interface may be dynamic and have one or more modes. FIGS. 4-10B illustrate a first exemplary graphical user interface of the analysis system 100. FIGS. 11-13 illustrate a second exemplary graphical user interface of the analysis system 100.

Figure 3:
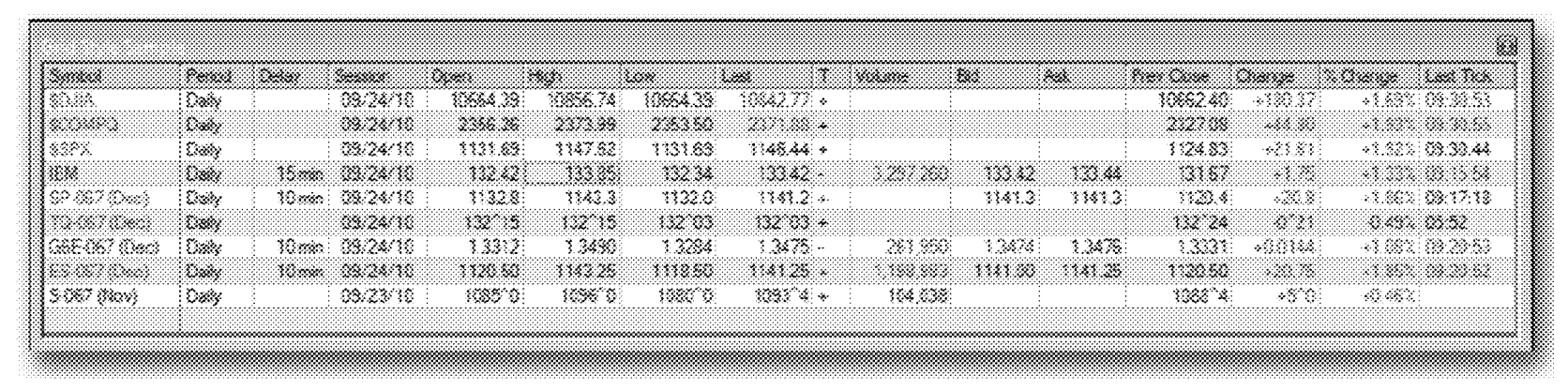
Figure 4:
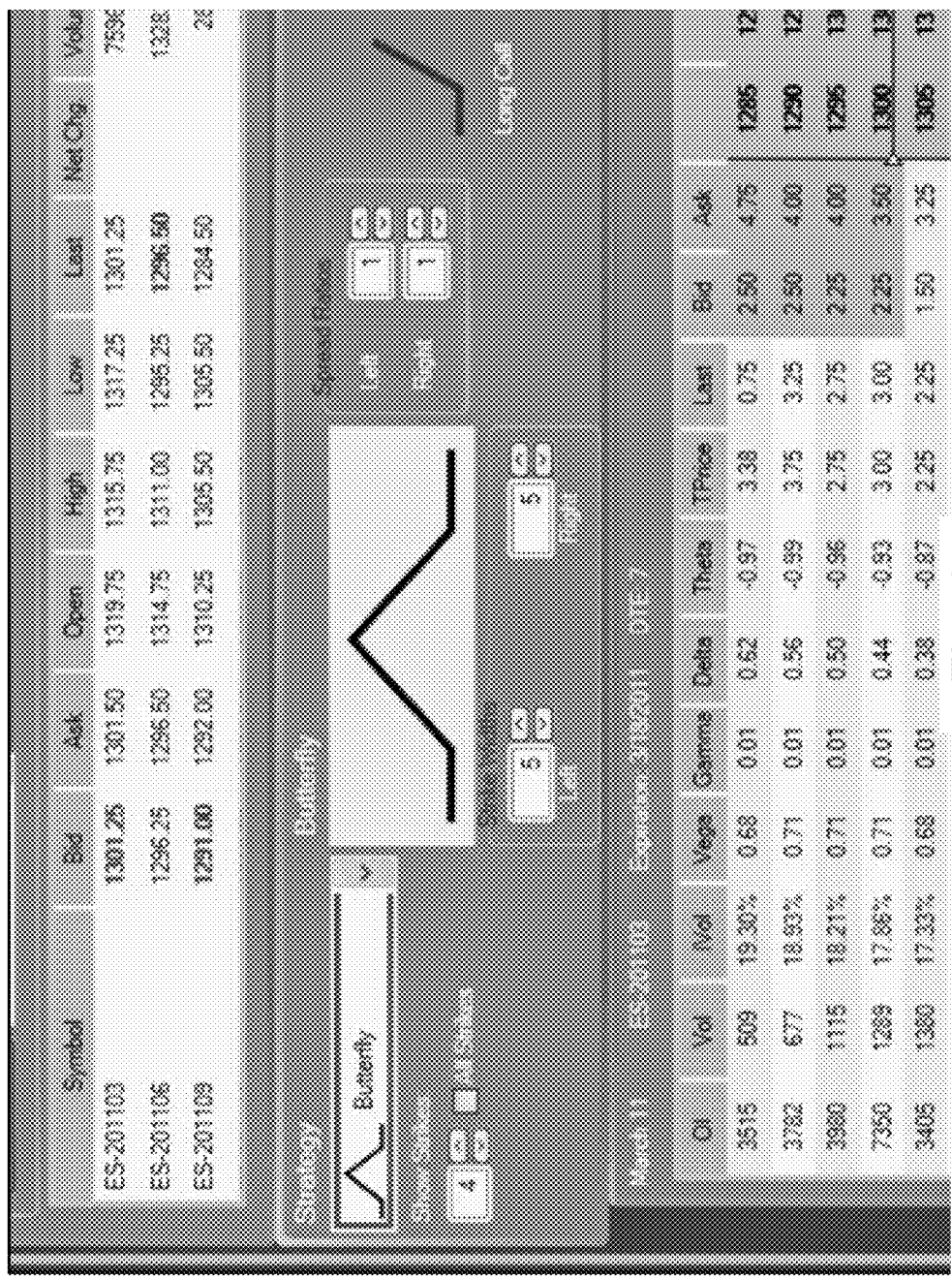
FIG. 4 illustrates an exemplary graphical user interface showing data related to historical pricing of a stock.

As shown in FIG. 4, the graphical user interface may show data related to historical pricing of the stock in question. The analysis system 100 may be configured to use various charts throughout its interfaces, which may include, for example, tables, graphs, and other visualizations. FIG. 3 illustrates an exemplary data chart that may be provided to display historical stock data. The columns and rows of this chart may be customizable by a user.

Figure 5:
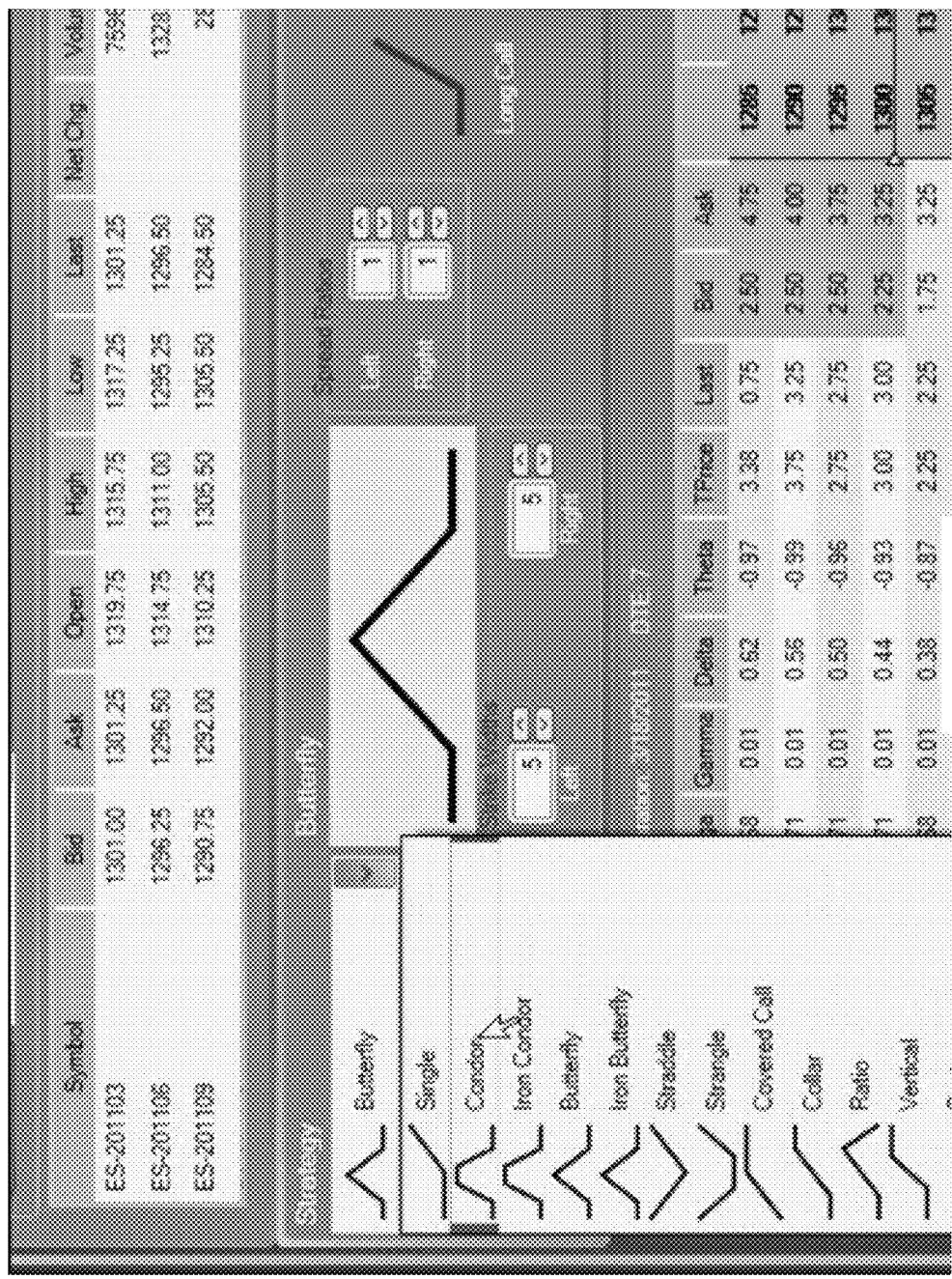
FIG. 5 illustrates an exemplary means of selecting an initial transaction strategy.

Referring again to FIG. 4, the graphical user interface may also include a mechanism whereby the user can select a particular one of a plurality of available trading strategies to examine or apply to the stock. For example, this strategy-selection mechanism may be a drop-down box, such as is illustrated in FIG. 5. As shown, the available strategies may include the following, without limitation: Single, Condor, Iron Condor, Butterfly, Iron Butterfly, Straddle, Strangle, Covered Call, Collar, Ratio, Vertical, and Custom. In addition to enabling selection of a particular strategy, the graphical user interface may also include a graphical depiction of one or more of the strategies.

Figure 6:
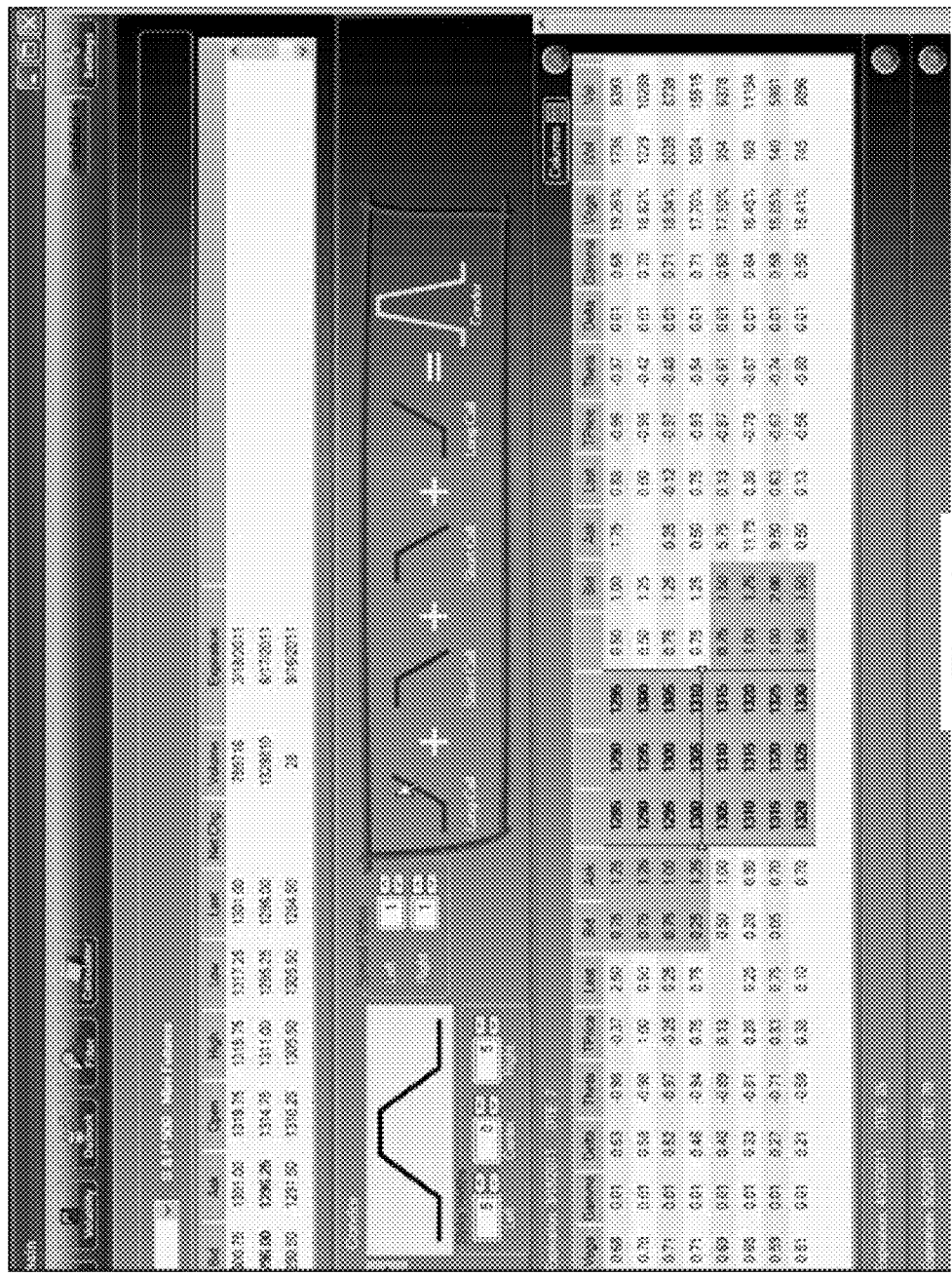
FIG. 6 illustrates an exemplary graphical user interface showing various parts of a transaction strategy.
Figure 7:
FIG. 7 illustrates a manner of switching display modes in an exemplary graphical user interface.
Figure 8:
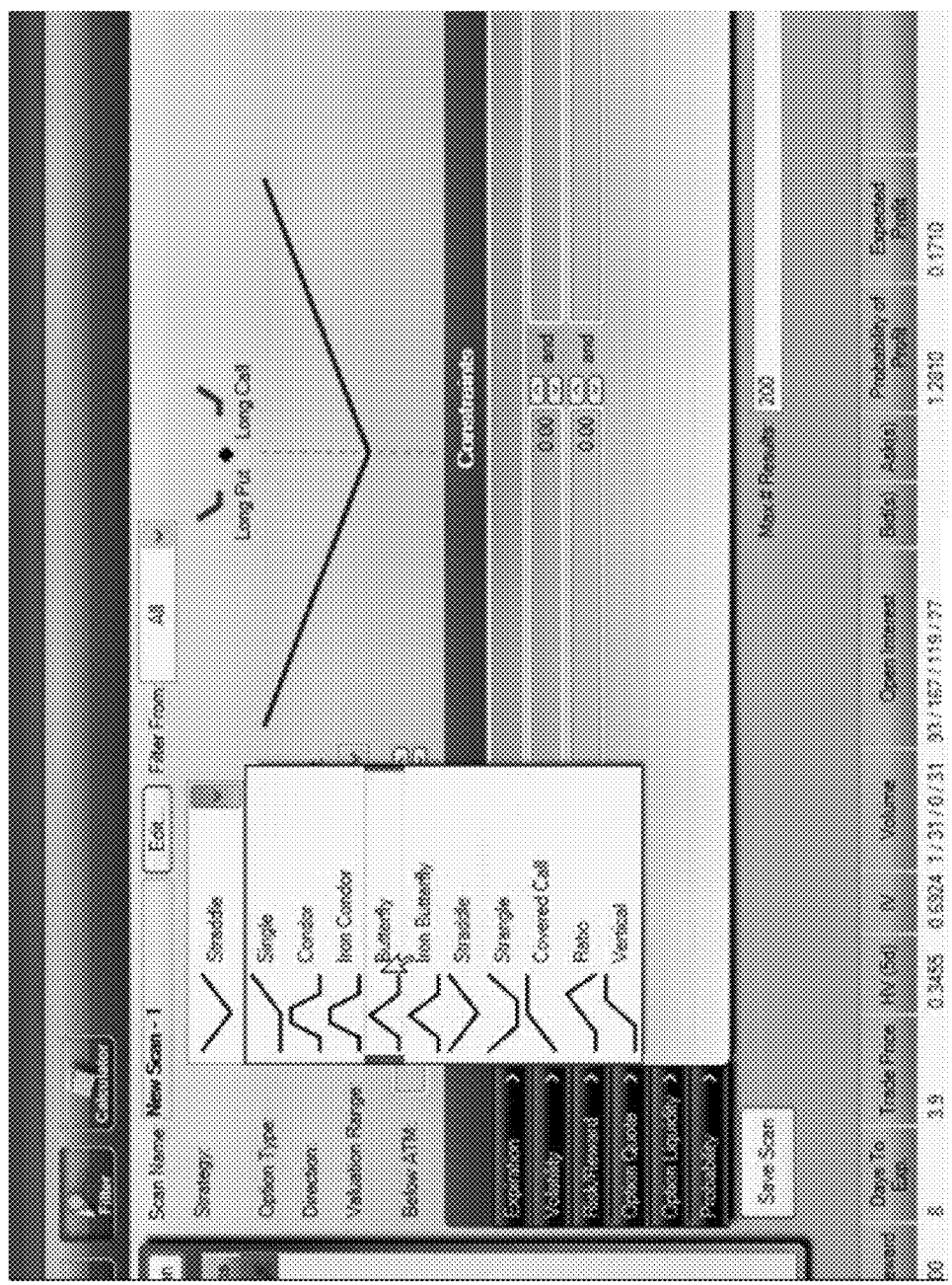
FIG. 8 illustrates exemplary selection of a filtering strategy.

After the user selects a strategy, the graphical user interface may show expected results of applying the selected strategy to the stock in question. The graphical user interface may also graphically illustrate the various parts, components, or steps making up the selected strategy. For example, a complex option strategy requires multiple sells and buys of options. As illustrated in FIG. 6, the Condor strategy is a combination of buying a first call, selling the first call, selling a second call, and buying a third call. For a trader, the exact portions of the strategy can be confusing. A visual representation may simplify the strategy in the mind of the trader. Accordingly, the clarification and insight provided by the analysis system 100 may create a significant advantage for the trader This advantage is also available when the user searches the analysis system 100 for trading opportunities based on the various available complex strategies. A user can opt to filter a selected strategy by switching the analysis system 100 to a filtering mode, which may be initiated, for example, by selecting a "Filter" button 710, as shown in FIG. 7. As shown in FIG. 8, the user can select a strategy to use as a filter, such as by means of a drop-down box. After the strategy is selected, the graphical user interface may once again visually display components, or steps, that make up the selected strategy. The visualization of the strategy may give the user an advantage in seeing and understanding how the pieces of the strategy are constructed. For example, as shown in FIG. 9, a Butterfly strategy includes buying a first call, selling a first call, selling a second call, and buying a third call.

Through some mechanism in the graphical user interface, such as a text box or buttons, the user can modify the individual spread widths within the selected strategy. For example, FIGS. 10A-10B illustrate modifying the spread widths of an Iron Condor strategy. More specifically, FIG. 10A illustrates the graphical user interface before the modification, and FIG. 7B illustrates the graphical user interface after the modification. As shown, the graphical depiction of the strategy may dynamically update in response to the modification. The dynamically illustrated changes in the risk analysis and the components of the strategy may enable the user to see various components of the trade instantly, thus reducing the chances for any confusion before initiating the trade or strategy. Various other data displayed on the graphical user interface, such as expected results of applying the strategy, may also update dynamically to reflect the modification.

As mentioned above, FIGS. 11-13 illustrate a second graphical user interface of the analysis system 100. As shown in FIG. 11, which is marked-up with numeric references, the graphical user interface may include a price graph 1110, a profit-zone map 1120, an order-expiration line 1130, and a risk graph 1140. These aspects of the graphical user interface may dynamically update as the user interacts with the analysis system 100 through the graphical user interface and as new data is received from external sources over a network.

The pricing graph 1110 may graphically illustrate historical pricing of the stock being analyzed.

The profit-zone map 1120 may graphically illustrate profit zones of the strategy. The map 1120 may include various regions, including a first zone 1124 and a second zone 1128. The first zone 1124 may be at least partially enclosed within the second zone 1128. The first zone 1124, or the profit zone, may represent a desirable range at which a profit would result. Contrastingly, the second zone 1128, or non-profit zone, may represent an undesirable range at which a profit would not likely result. The zones 1124 and 1128 may thus represent changing price ranges with respect to the time requirement of an option trade. The profit zones 1124 and 1128 may be displayed and updated dynamically based on strategy components selected by the user. In an exemplary embodiment, the profit-zone map 1120 may be a color graph or may utilize at least two shades of a color, so as to distinctly illustrate the border between the first region 1124 and the second region 1128.

The order-expiration line 1130 may enable trading options and building order tickets with one or more underlying legs or parts. Where there are certain relevant dates, the expiration line 1130 may be included in the interface. The expiration line 1130 represents when options are set to expire. As the user places a cursor on the options expiration line 1130, the expiration line 1130 may show the strike price, along with a buy and sell option. As the cursor moves up the expiration line 1130, the user can choose to buy or sell higher strike prices directly from the interface. As the cursor moves down along the options expiration line 1130, the user can select to buy or sell lower strike priced options.

FIG. 12 illustrates a larger view of the risk graph 1140, which may be a "modern risk graph," as referred to in the art. The risk graph 1140 may illustrate the profit or loss of an option across a spectrum of prices. The risk graph 1140 represents profits over a time and price range.

The risk graph 1140 and the profit-zone map 1120 may dynamically update when legs are added or modified for the current strategy. FIG. 13 illustrates the legs of the strategy depicted in this example. This set of legs may be modified by the user, and in response, the graphical user interface may dynamically update as needed to show the effects of the modifications.

In conventional software to assist traders, changes to a strategy are made on a first page or window, and then the user must switch a second page or window to see the results of the changes. This is a highly inconvenient process, especially given that insufficient graphical feedback is provided. Various embodiments of the analysis system 100 may benefit users by graphically depicting trading strategies. This can assist beginners in learning about trading and can also assist experienced users by enabling them to more efficiently and intuitively plan their trades. Accordingly, the instant visualization of risk, profit zones, and trade strategy components may provide the user with instant clarity and a significant trading advantage.

Figure 14:
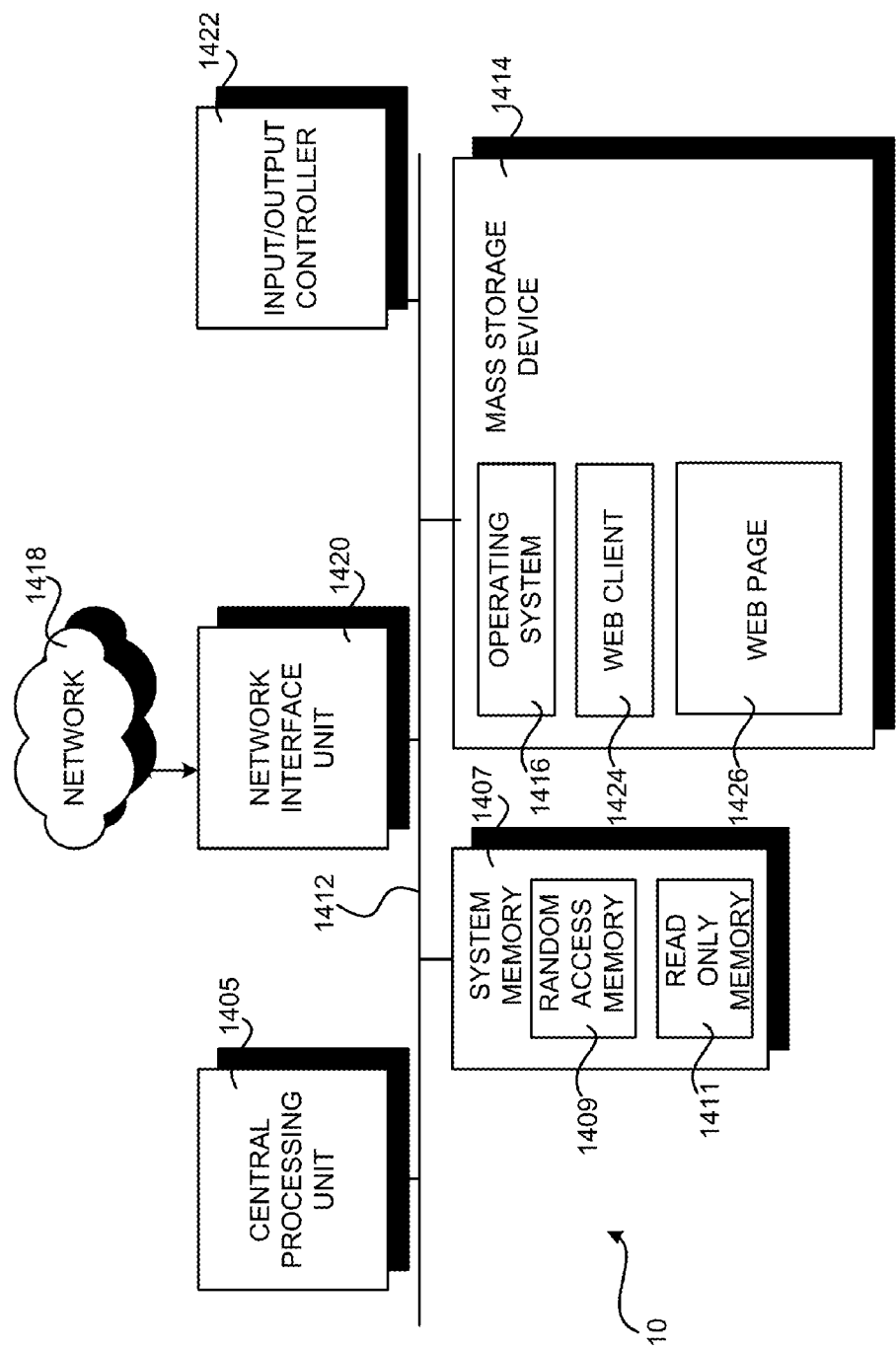
FIG. 14 illustrates an architecture of a computer system for implementing the analysis system, according to an exemplary embodiment.

Various aspects of the analysis system 100 may be embodied, in whole or in part, in one or more non-transitory computer-readable medium for execution by a computer processor. FIG. 14 illustrates an exemplary architecture for such a computing device 50, which may be, for example, a desktop computer, notebook computer, mobile computer device, distributed computer system, or other device capable of supporting aspects of the analysis system 100. Those skilled in the art will recognize that the general architecture described in reference to FIG. 14 is for example only, and may be modified to accommodate various embodiments of the analysis system 100.

As shown in FIG. 14, the computing device 50 may comprise a central processing unit 1405 ("CPU") and one or more system memories 1407, such as a random access memory 1409 ("RAM") and a non-volatile memory, such as a read-only memory ("ROM") 1411. The computing device 50 may further comprise a system bus 1412 coupling together the memory 1407, the CPU 5, and various other components. A basic input/output system containing routines to assist in transferring information between components of the computing device 50 may be stored in the ROM 1411.

The computing device 10 may comprise, or may be associated with, various forms of computer-readable media. One such form of computer-readable media may be embodied in a mass storage device 1414. Although the description of computer-readable media contained herein generally refers to a mass storage device 1414, such as a hard disk or CD-ROM drive, it will be appreciated by those skilled in the art that computer-readable media may include many available media accessible by the computing device 10, such as flash storage or a media card installed in a mobile phone. The mass storage device 1414 may store an operating system 1416, application programs, and other program units. The mass storage device 1414 may be connected to the CPU 1405 through a mass storage controller (not shown) connected to the bus 1412. The mass storage device 1414 may provide non-volatile storage for the computing device 10.

Computer-readable media may include computer storage media, such as volatile and non-volatile, removable and non-removable media implemented in many methods or technologies for storage of information, such as computer-readable instructions, data structures, program units, or other data. Computer storage media may include, but is not limited to, RAM, ROM, EPROM, EEPROM, flash memory, other solid state memory technology, CD-ROM, digital versatile disks ("DVD"), other optical storage, magnetic cassettes, magnetic tape, magnetic disk storage, other magnetic storage devices, or many other media that may be used to store the desired data and may be accessible by the computing device 10. Computer-readable instructions on the storage media of the computing device 10 may include, for example, instructions for implementing processes, preferably client-side processes, of the analysis system 100.

According to various embodiments, the computing device 10 may operate in a networked environment using logical connections to remote computers or other devices, such as a server or data sources 50 in communication with the data unit 110. These connections may be provided through a network 1418, such as the Internet. The computing device 10 may connect to the network 1418 through a network interface unit 1420 connected to the bus 1412. It will be appreciated that the network interface unit 1420 may also be utilized to connect to other types of networks and remote computer systems.

The computing device 10 may also include an input/output controller 1422 for receiving and processing input from a number of other devices, including a keyboard, mouse, touchsensitive surface, or electronic stylus. The input/output controller 1422 may provide output to a display screen, a printer, or other type of output device.

A number of program units and data files may be stored in the mass storage device 1414 and RAM 1409 of the computing device 10. Such program units and data files may also include an operating system 1416 suitable for controlling operations of a networked mobile phone or personal computer. A web browser application program, or web client 1424, may also be stored on the mass storage device 1414 and the RAM 1409. The web client 1424 may comprise an application program for requesting and rendering web pages 1426 created in Hypertext Markup Language ("HTML") or other types of markup languages. The web client 1424 may also be capable of executing client side objects, as well as scripts through the use of a scripting host. The scripting host executes program code expressed as scripts within the browser environment. In some embodiments, the analysis system 100 may be implemented, at least partially, as a web-based application, in which case it may be executed on the computing device 10 through the web client 1424.

While analysis systems and methods have been disclosed in some exemplary forms, many modifications, additions, and deletions may be made without departing from the spirit and scope of the system, method, and their equivalents, as set forth in the following claims.

What is claimed is:

1. A computer program product embodied in a non-transitory computer readable medium that stores instructions that, when executed by at least one processor, effectuate a method comprising:
   receiving historical data related to pricing of a tradeable asset;
   receiving an indication of an initial transaction strategy associated with the tradeable asset;
   responsive to receiving the indication of the initial transaction strategy associated with the tradeable asset:
      displaying a line graph representing the initial transaction strategy associated with the tradeable asset, the initial transaction strategy comprising two or more legs, each leg representing a transaction associated with the initial transaction strategy;
      calculating, based on the historical data, expected transaction strategy results associated with applying the initial transaction strategy to the first tradeable asset; and
      displaying an indication of the expected transaction strategy results;
   receiving an indication of a user customization to the initial transaction strategy, the user customization comprising an adjustment to a portion of the line graph corresponding to at least one leg of the initial transaction strategy; and
   responsive to receiving the indication of the user customization:
      automatically updating, based on the user customization, the line graph to represent a modified transaction strategy;
      calculating, based on the historical data, updated expected transaction strategy results associated with applying the modified transaction strategy to the first tradeable asset; and
      displaying an indication of the updated expected transaction strategy results.

2. The computer program product of claim 1, the tradeable asset being a stock, and the initial transaction strategy being a trading strategy.

3. The computer program product of claim 1, the tradeable asset being a stock, and the two or more legs of the initial transaction strategy being options to trade the stock.

4. The computer program product of claim 1, the method further comprising:
   responsive to receiving an indication of a filtering command, determining one more tradeable assets associated with trading opportunities having expected transaction strategy results that, based on applying the modified transaction strategy to a respective tradeable asset, satisfy predetermined criteria; and
   displaying an indication of the tradeable assets having expected transaction strategy results that satisfy the predetermined criteria.

5. The computer program product of claim 4, the set of predetermined criteria including an expected profit value.

6. The computer program product of claim 4, the set of predetermined criteria including an expected trade cost.

7. The computer program product of claim 1, the method further comprising:
   displaying a plurality of line graphs, each line graph representing a respective leg of the two or more legs of the initial transaction strategy, and displaying an indication that the first line graph reflects a combination of the plurality of line graphs.

8. The computer program product of claim 1, the expected transactions strategy results displayed as numerical data.

9. A method comprising:
   receiving historical data related to pricing of a tradeable asset;
   receiving an indication of an initial transaction strategy associated with the tradeable asset;
   responsive to receiving the indication of the initial transaction strategy associated with the tradeable asset:
      displaying a line graph representing the initial transaction strategy associated with the tradeable asset, the initial transaction strategy comprising two or more legs, each leg representing a transaction associated with the initial transaction strategy;
      calculating, by a processor and based on the historical data, expected transaction strategy results associated with applying the initial transaction strategy to the first tradeable asset; and
      displaying an indication of the expected transaction strategy results;
   receiving an indication of a user customization to the initial transaction strategy, the user customization comprising an adjustment to a portion of the line graph corresponding to at least one leg of the initial transaction strategy; and
   responsive to receiving the indication of the user customization:
      automatically updating, based on the user customization, the line graph to represent a modified transaction strategy;
      calculating, by the processor and based on the historical data, updated expected transaction strategy results associated with applying the modified transaction strategy to the first tradeable asset; and
      displaying an indication of the updated expected transaction strategy results.

10. The method of claim 9, the tradeable asset being a stock, and the initial transaction strategy being a trading strategy.

11. The method of claim 9, the tradeable asset being a stock, and the two or more legs of the initial transaction strategy being options to trade the stock.

12. The method of claim 9, the method further comprising:
responsive to receiving an indication of a filtering command, determining one more tradeable assets associated with trading opportunities having expected transaction strategy results that, based on applying the modified transaction strategy to a respective tradeable asset, satisfy predetermined criteria; and
displaying an indication of the tradeable assets having expected transaction strategy results that satisfy the predetermined criteria.

13. The method of claim 12, the set of predetermined criteria including an expected profit value.

14. The method of claim 12, the set of predetermined criteria including an expected trade cost.

15. The method of claim 9, the method further comprising:
displaying a plurality of line graphs, each line graph representing a respective leg of the two or more legs of the initial transaction strategy, and displaying an indication that the first line graph reflects a combination of the plurality of line graphs.

16. The method of claim 9, the expected transactions strategy results displayed as numerical data.

17. A system comprising:
a processor;
at least one memory operatively coupled to the processor and configured for storing data and instructions that, when executed by the processor, cause the processor to perform a method comprising:
receiving historical data related to pricing of a tradeable asset;
receiving an indication of an initial transaction strategy associated with the tradeable asset;
responsive to receiving the indication of the initial transaction strategy associated with the tradeable asset:
displaying a line graph representing the initial transaction strategy associated with the tradeable asset, the initial transaction strategy comprising two or more legs, each leg representing a transaction associated with the initial transaction strategy;
calculating, based on the historical data, expected transaction strategy results associated with applying the initial transaction strategy to the first tradeable asset; and
displaying an indication of the expected transaction strategy results;
receiving an indication of a user customization to the initial transaction strategy, the user customization comprising an adjustment to a portion of the line graph corresponding to at least one leg of the initial transaction strategy; and
responsive to receiving the indication of the user customization:
automatically updating, based on the user customization, the line graph to represent a modified transaction strategy;
calculating, based on the historical data, updated expected transaction strategy results associated with applying the modified transaction strategy to the first tradeable asset; and
displaying an indication of the updated expected transaction strategy results.

18. The system of claim 17, the tradeable asset being a stock, and the initial transaction strategy being a trading strategy.

19. The system of claim 17, the tradeable asset being a stock, and the two or more legs of the initial transaction strategy being options to trade the stock.

20. The system of claim 17, the expected transactions strategy results displayed as numerical data.

* * * * *